(12) United States Patent
Specht

(10) Patent No.: US 6,364,414 B1
(45) Date of Patent: Apr. 2, 2002

(54) APPARATUS FOR ADJUSTING A HEADREST ON A BACKREST OF A VEHICLE SEAT

(75) Inventor: Martin Specht, Feldafing (DE)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/561,800

(22) Filed: May 1, 2000

(30) Foreign Application Priority Data

Dec. 22, 1999 (DE) .......................................... 299 22 592

(51) Int. Cl.[7] .................................................. A47C 1/10
(52) U.S. Cl. ............... 297/410; 297/216.13; 297/284.1; 297/408
(58) Field of Search .......................... 297/216.1, 216.12, 297/216.13, 216.14, 391, 284.1, 354.12, 354.13, 404, 408, 406, 410

(56) References Cited

U.S. PATENT DOCUMENTS

| 5,346,283 A | * | 9/1994 | Steininger et al. ... 297/284.1 X |
| 5,630,650 A | * | 5/1997 | Peterson et al. ..... 297/284.1 X |
| 5,651,583 A | * | 7/1997 | Kingler et al. ....... 297/284.1 X |
| 5,664,841 A | * | 9/1997 | Dal Monte ................. 297/408 |
| 5,795,019 A | | 8/1998 | Wieclawski ............ 297/216.12 |
| 5,913,569 A | * | 6/1999 | Klingler .............. 297/284.1 X |
| 5,927,804 A | * | 7/1999 | Cuevas .............. 297/216.13 X |
| 5,984,407 A | * | 11/1999 | Ligon, Sr. et al. .... 297/284.1 X |
| 6,003,941 A | * | 12/1999 | Schuster, Sr. et al. ... 297/284.1 |
| 6,007,151 A | * | 12/1999 | Benson ................ 297/284.1 X |

* cited by examiner

Primary Examiner—Peter M. Cuomo
Assistant Examiner—Stephen Vu
(74) Attorney, Agent, or Firm—Lonnie Drayer; Jarett Rieger

(57) ABSTRACT

A headrest on a backrest of a vehicle seat is supported on a rocker that is pivotal round a pivot axis fixed on the backrest frame. The headrest is adjusted by an adjusting device that transmits an adjusting movement to the rocker via a movement-transmitting device.

7 Claims, 3 Drawing Sheets

APPARATUS FOR ADJUSTING A HEADREST ON A BACKREST OF A VEHICLE SEAT

FIELD OF THE INVENTION

The invention relates to an apparatus for adjusting a headrest on a backrest of a vehicle seat in which the headrest is supported on a rocker that is pivotal round a pivot axis fixed on the backrest frame.

DISCUSSION OF THE PRIOR ART

An apparatus of this type is known from U.S. Pat. No. 5,795,019. With the known apparatus, the headrest is pivoted forward in the case of a rear impact on the vehicle. This is due to inertial forces acting on the rocker owing to the inert mass of the vehicle occupant's body and pivot forwards the rocker and the headrest supported thereon.

SUMMARY OF THE INVENTION

With the present invention, an adjusting device, of which the adjusting movement can be transmitted to the rocker via a movement-transmitting device, in particular a Bowden cable, is provided on the vehicle seat. The adjusting device preferably has a self-locking design so that the headrest is held in the respectively adjusted position. The adjusting device is preferably supported on the backrest frame. The adjusting movement is preferably transmitted to the rocker by a Bowden cable. For this purpose, the Bowden cable sheath can act as a movement-transmitting element while the Bowden cable wire is fixed on the backrest frame. For example, a worm gear that is self-locking can displace a sleeve connected rigidly to the end of the Bowden cable sheath with an internal worm thread for achieving the adjusting movement by means of an electrical or manual drive. This movement is transmitted to the rocker by the Bowden cable sheath that is stiff in its axial direction. The headrest can therefore be brought into any desired position, in particular into a comfortable position during normal travel. In the respectively adjusted position, the headrest and the rocker are supported on the backrest frame via the movement-transmitting element, in particular the Bowden cable sheath, which is designed rigidly in the movement-transmitting direction. Two Bowden cables that are supported on the backrest frame on the two sides of the backrest can optionally be used for transmitting the adjusting movement. At its top, the backrest frame can have a frame part which bridges the two lateral frame parts of the backrest frame and on which the upper end of the respective Bowden cable wire is fastened. Guide orifices for supporting rods on which the headrest is fastened can also be provided on this substantially horizontally extending frame part.

BRIEF DESCRIPTION OF THE DRAWINGS

The invention will be described in more detail by means of an embodiment with reference to the figures, in which.

DETAILED DESCRIPTION OF THE INVENTION

Figure 1:
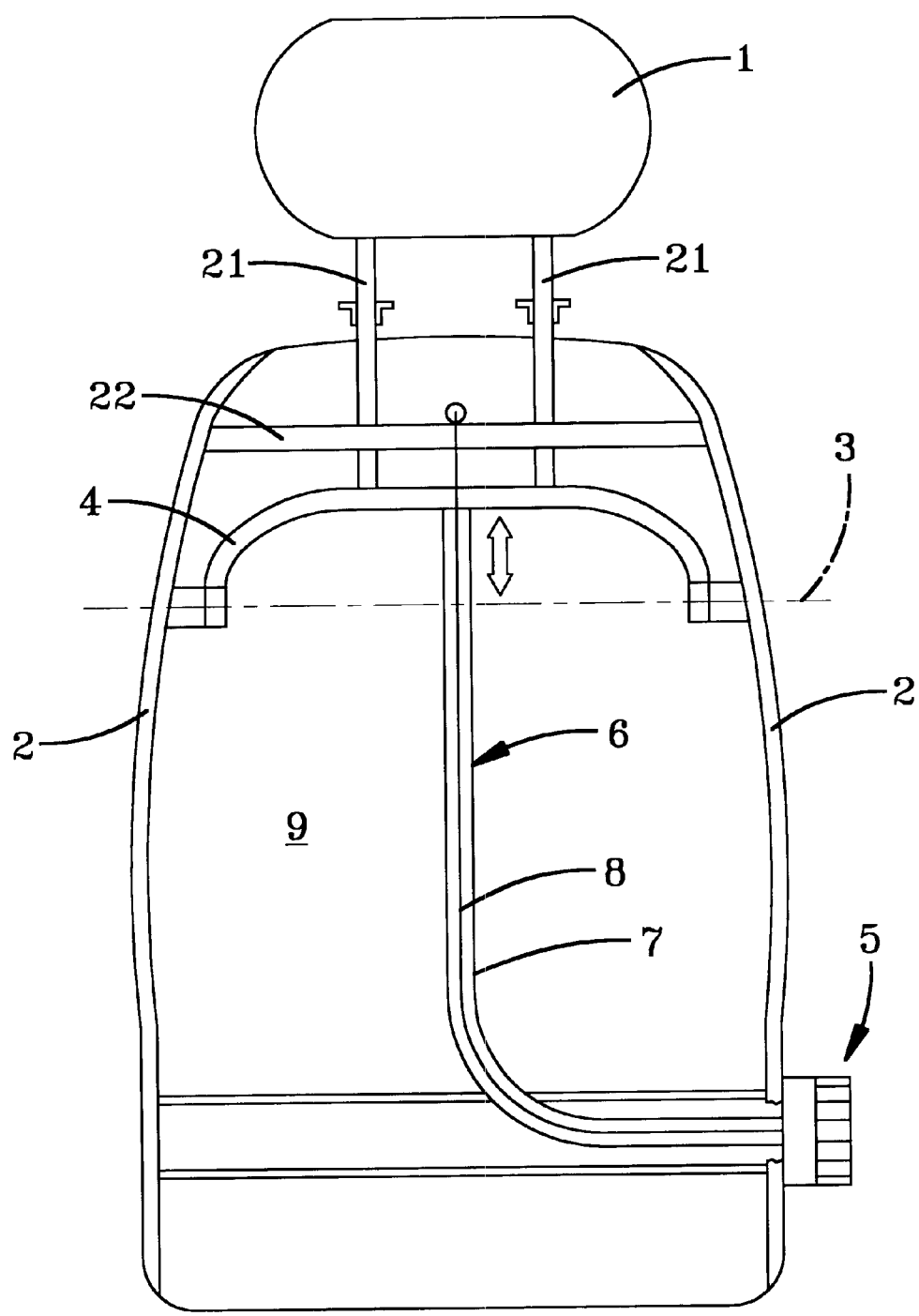
FIG. 1 is a front view of an embodiment of the invention.
Figure 2:
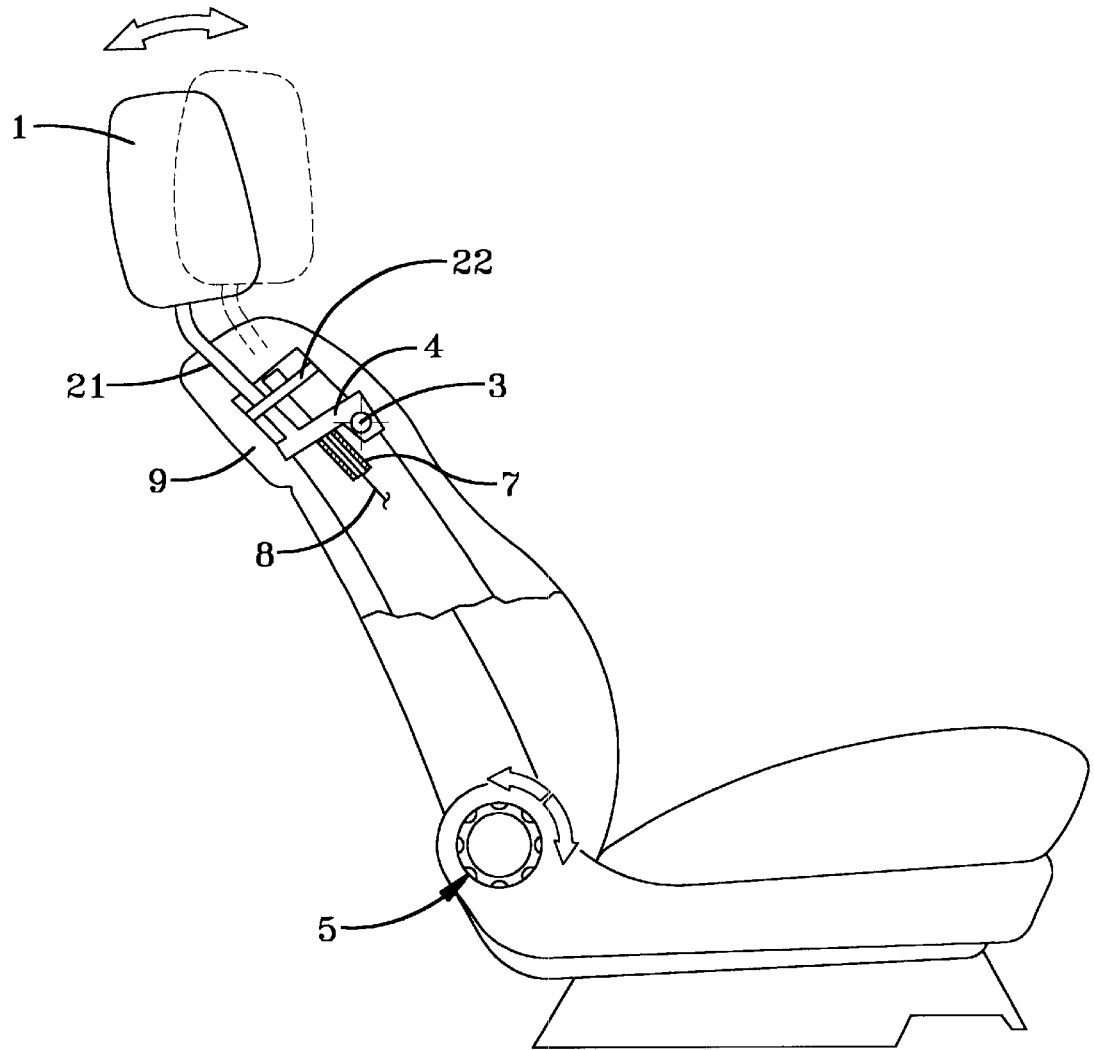
FIG. 2 is a side view of the embodiment shown in FIG. 1.

The embodiment shown in the figures of the apparatus for adjusting a headrest 1 on a backrest 9 of a vehicle seat possesses a rocker 4 which is pivotal round a pivot axis 3 fixed on the backrest frame 2. The headrest is supported on the rocker 4 via supports 21. The headrest 1 is optionally mounted on the rocker 4 in a vertically adjustable manner.

Figure 3:
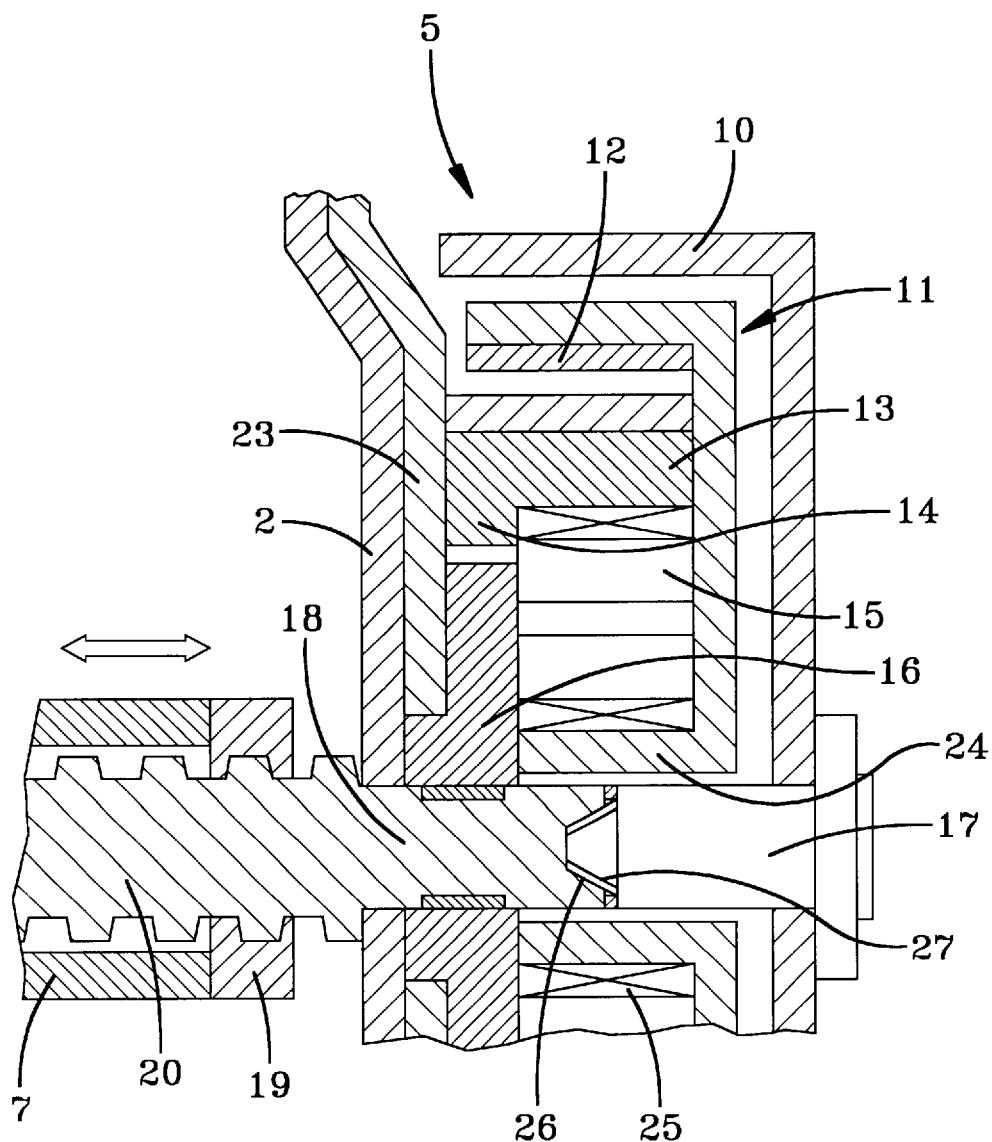
FIG. 3 is a sectional view of an embodiment of an adjusting device that is used in the embodiment.

The rocker 4 can be pivoted round the pivot axis 3 by means of an adjusting device 5 of which a configuration is shown in FIG. 3. The adjusting movement produced by the adjusting device 5 is transmitted to the rocker 4 via a movement-transmitting device 6 which is designed as a Bowden cable in the embodiment illustrated. The Bowden cable consists of a Bowden cable sheath 7 which is rigid in design in its axial dimension and of a Bowden cable wire 8 guided in the Bowden cable sheath in a known manner. The Bowden cable wire 8 is fixed on a substantially horizontally extending backrest frame part 22 at its upper end. The backrest frame part 22 connects the two lateral backrest frame parts 2 at their upper ends.

The lower end of the Bowden cable wire 8 is fixed on the adjusting device 5 or in the region of the adjusting device 5. This fastening point is supported on the backrest frame 2. The upper end of the Bowden cable sheath 7 acts on the rocker 4. The lower end of the Bowden cable sheath 7 is supported on an adjusting sleeve 19 (FIG. 3) which is guided on an adjusting screw 20. The adjusting screw 20 can be connected in a non-rotatable manner to a hand wheel 10 via a connecting bolt 17. For this purpose, engagement points 26, 27 which are disengaged from one another during normal operation are provided on an output shaft 18 connected in a non-rotatable manner to the adjusting screw 20 and on the connecting bolt 17 connected in a non-rotatable manner to the hand wheel as shown in FIG. 3. The two engagement points 26, 27 can be pushed into one another, for example by exertion of pressure axially on the hand wheel 10, so that the connecting bolt 17 and the output shaft 18 are connected to one another in a non-rotatable manner. This movement is transmitted via the connecting bolt to the output shaft 18 during rotation of the hand wheel 10. Since the output shaft 18 is connected rigidly or integrally to the adjusting screw 20, the adjusting screw 20 is rotated. The adjusting sleeve 19 is displaced during the rotation of the adjusting screw 20 depending on the direction of rotation in the axial direction of the adjusting screw. This adjusting movement is transmitted to the Bowden cable sheath 7 and the rocker 4. The rocker 4 is thus pivoted either up or down so that the headrest 1 can be brought into a suitable position, for example a comfortable position.

The rocker 4 can also be adjusted by an electric motor. An electric motor 11 provided in the interior of the hand wheel 20 is activated accordingly for this purpose. The electric motor can be designed with a flat construction as a collector-free d.c. motor in a known manner (DE 43 02 042 A1). The electric motor has a rotor 12 that is designed in the shape of a hood and as an external rotor. The stator 13 that is supported on the lateral backrest frame 2 via an adapter plate 23 is located in the interior of the rotor. In the interior of the stator 13 is a ring gear 14 that forms a reducing planetary gear together with one or more planet wheels 15. The planet wheel or the, for example, three planet wheels 15 are mounted on a planet wheel carrier 16 which is connected in a non-rotatable manner to the output shaft 18. The rotor 12 of the electric motor 11 is mounted in a rotatable manner relative to the connecting bolt 17 by a bearing collar 24. Therefore, the hand wheel 10 is not rotated at the same time. The rotatable mounting of the rotor 12 can be effected via the planetary gear on the stator 13 and therefore on the adapter plate 23. On its exterior, the bearing collar possesses teeth that form a sun wheel 25 of the planetary gear. The planet wheel or wheels 15 engage in the teeth of the ring gear 14 and in the teeth of the sun wheel 25. The rotation of the rotor 12 is reduced by the planetary gear and transmitted via the planet wheel carrier 16 to the output shaft 18 and therefore to the adjusting screw 20. As already explained, the adjusting movement is transmitted to the rocker 4 via the Bowden cable sheath 7 acting as a thrust means.

The electric motor-driven adjusting movement can also be evaluated in conjunction with precrash sensor signals or crash signals in that the headrest 1 is moved upward and forward from a respective comfortable position into a safety position by the electric motor-driven adjusting movement. This is effected by corresponding pivoting of the rocker 4.

The rocker 4 is supported on the backrest frame 2 via the Bowden cable sheath 7 that is stiff in its longitudinal dimension. This support can be provided by the adjusting sleeve 19 mounted on the adjusting screw 20 and the output shaft 18 supported axially on the backrest frame 2, as shown in FIG. 3.

Many changes and modifications in the above-described embodiments of the invention can be carried out without departing from the scope thereof. Accordingly, that scope is intended to be limited only by the scope of the appended claims.

I claim:

1. A vehicle seat comprising:
 a) a headrest supported on a rocker by supports, the supports directly connect the headrest to the rocker,
 b) a backrest frame having a frame part which bridges two lateral frame parts of the backrest frame, the rocker is fixed on the backrest frame, the rocker pivots around a pivot axis, and
 c) an adjusting device by which an adjusting movement can be transmitted to the rocker via a movement-transmitting device, the adjusting device is mounted on the vehicle seat, the movement transmitting device is a Bowden cable and the adjusting device is directly connected to the rocker, wherein the adjusting device can be actuated electrically as a function of a precrash signal.

2. The vehicle seat according to claim 1 wherein the adjusting device can be actuated manually.

3. The vehicle seat according to claim 1 wherein a Bowden cable sheath transmits the adjusting movement to the rocker and a Bowden cable wire is fastened on the backrest frame.

4. The vehicle seat according to claim 1 wherein the adjusting device is self-locking.

5. The vehicle seat according to claim 1 wherein the adjusting device is self-locking.

6. The vehicle seat according to claim 1 wherein the adjusting device is self-locking.

7. The vehicle seat according to claim 1 wherein the electric actuation of the adjusting device can be controlled as a function of a crash signal.

* * * * *